United States Patent [19]
Guevara

[11] Patent Number: 5,590,191
[45] Date of Patent: Dec. 31, 1996

[54] REINFORCED PUBLIC TELEPHONE HAVING DUAL KEY PADS

[75] Inventor: Nelson V. Guevara, Wharton, N.J.

[73] Assignee: Independent Enclosures, Inc., Wharton, N.J.

[21] Appl. No.: 406,270

[22] Filed: Mar. 16, 1995

[51] Int. Cl.⁶ .................................................. H04M 1/00
[52] U.S. Cl. ......................... 379/451; 379/437; 379/368; 379/453
[58] Field of Search ................................ 379/451, 437, 379/428, 447, 445, 453, 368, 369, 144, 145

[56] References Cited

U.S. PATENT DOCUMENTS

| | | | |
|---|---|---|---|
| 4,160,136 | 7/1979 | McGough | 379/368 |
| 5,134,654 | 7/1992 | McGough | 379/451 |
| 5,394,468 | 2/1995 | Wood | 379/453 |

FOREIGN PATENT DOCUMENTS 2182824  5/1987  United Kingdom .................. 379/445

*Primary Examiner*—Krista M. Zele
*Assistant Examiner*—Jack Chiang
*Attorney, Agent, or Firm*—Richard T. Laughlin, Esq.; Graham, Curtin & Sheridan

[57] ABSTRACT

A public telephone having an anti-theft front wall assembly is provided. The public telephone includes a housing having a front wall, a face plate fixedly attached to the front wall at the exterior thereof, a key pad attached to the front wall at the interior thereof, key pad actuators being behind the front wall and actuator stem portions extending through aligned stem holes in the face plate, the stem portions and holes having reduced diameters so that web portions between stem holes are wider and stronger.

12 Claims, 5 Drawing Sheets

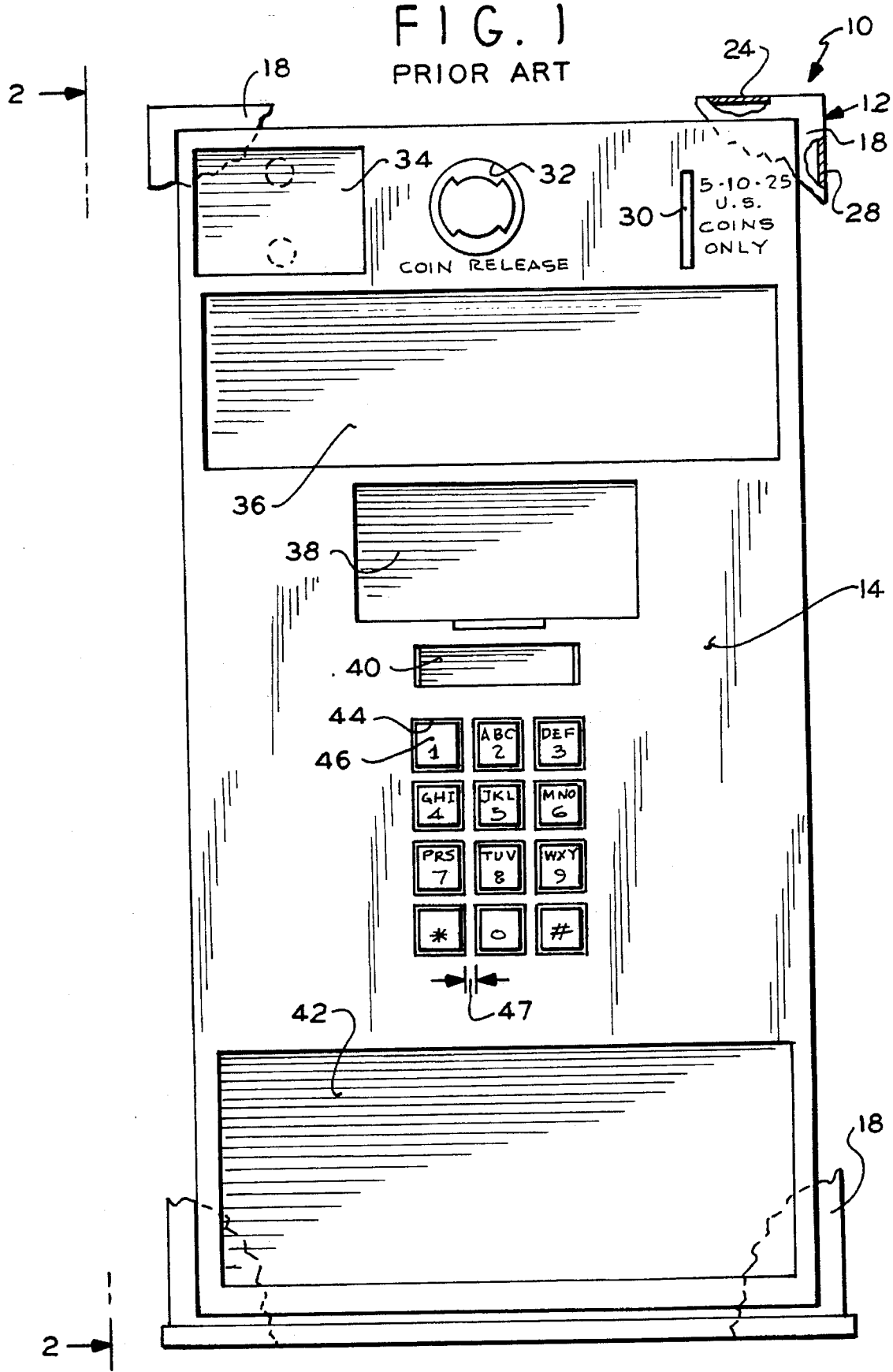

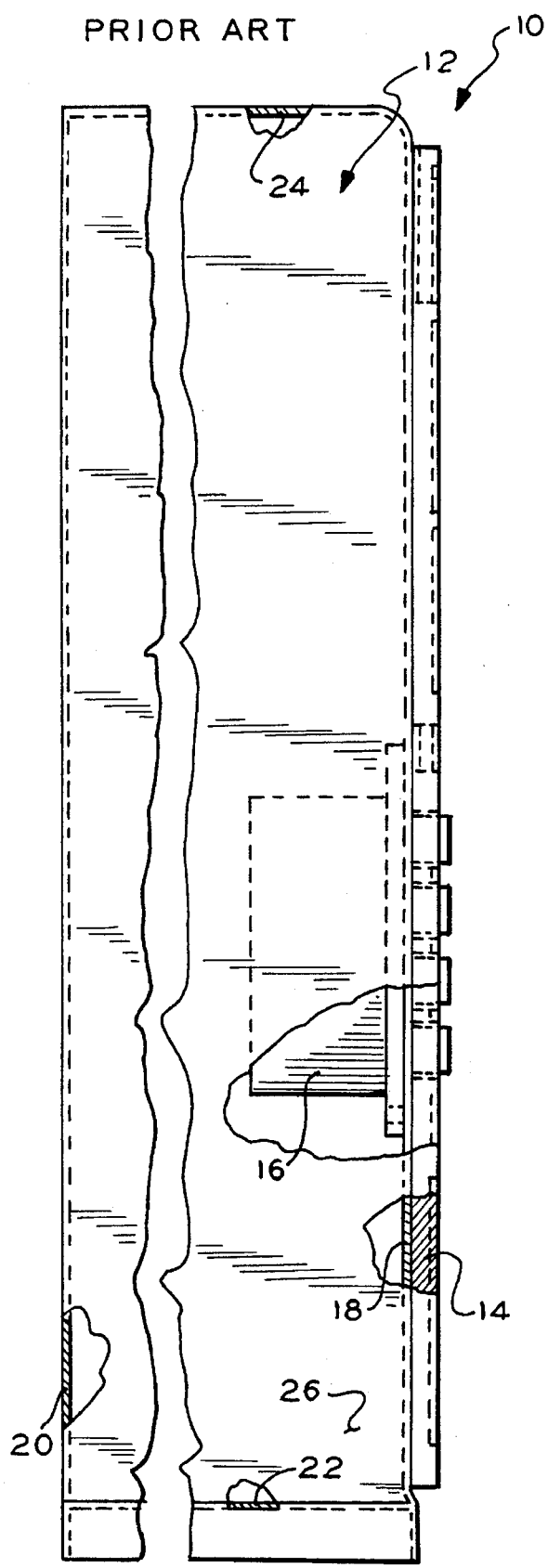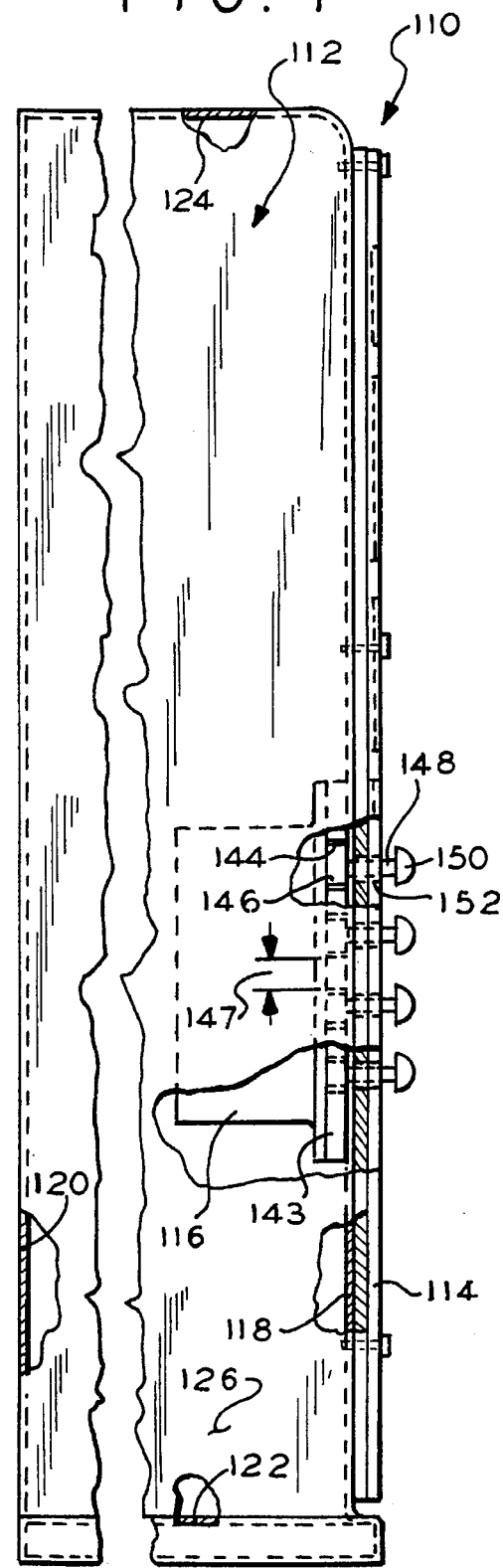

REINFORCED PUBLIC TELEPHONE HAVING DUAL KEY PADS

FIELD OF THE INVENTION

The invention generally relates to a public telephone and, in particular, to a public telephone having an anti-theft assembly.

BACKGROUND OF THE INVENTION

The prior art public telephone includes a housing, a headset and a hook for holding the headset when not in use and a key pad, the housing having a front wall, a rear wall, a bottom wall, a top wall, a left side wall and a right side wall, the key pad having a plurality of finger actuators, the front wall having square holes for the finger actuators, each finger actuator having an end face with a selective area to suit a finger tip, and the front wall having web portions disposed between pairs of adjacent common holes. The front wall usually has a hole of about 3.5 inches square to allow the key pad to penetrate.

One problem with the prior art public telephone is that each web portion is relatively thin and can be broken away along with the key pad by impact forces applied thereto by a thief, for gaining access to coins disposed within the telephone as well as to the electronics of the telephone. As a result of this vulnerability, the owner of the telephone installation can lose the major part of his investment in the telephone.

SUMMARY OF THE INVENTION

According to the present invention, a public telephone is provided. The telephone has a box which comprises a housing and associated headset and hook, and a conventional key pad. The housing having a front wall, a rear wall, a bottom wall, a top wall, a left side wall and a right side wall. The key pad has a plurality of square buttons. A face plate is provided over the front wall. The face plate has a corresponding plurality of holes relatively of small diameter receiving stems affixed to the cover plate and contacting the keys, and the face plate having the plurality of web portions respectively disposed between pairs of adjacent common holes. By using reduced diameter holes in the face plate, the web portions are relatively larger in width whereby damaged of the web portions is minimized.

One object of the present invention is to provide a public telephone having an anti-theft or anti-vandal face plate assembly.

Another object of the invention is to provide a telephone which has multi-deterrents to theft or destruction.

Other objects, features and the advantages of the invention will be apparent from the following description of the preferred embodiment of the invention as illustrated in the accompanying drawings.

BRIEF DESCRIPTION OF THE DRAWINGS

FIG. 1 is an elevation view of a prior art public telephone;

FIG. 2 is an elevation view as taken along the line 2—2 of FIG. 1;

FIG. 4 is an elevation view as taken along the line 4—4 of FIG. 3;

DESCRIPTION OF THE PREFERRED EMBODIMENT

Figure 3:
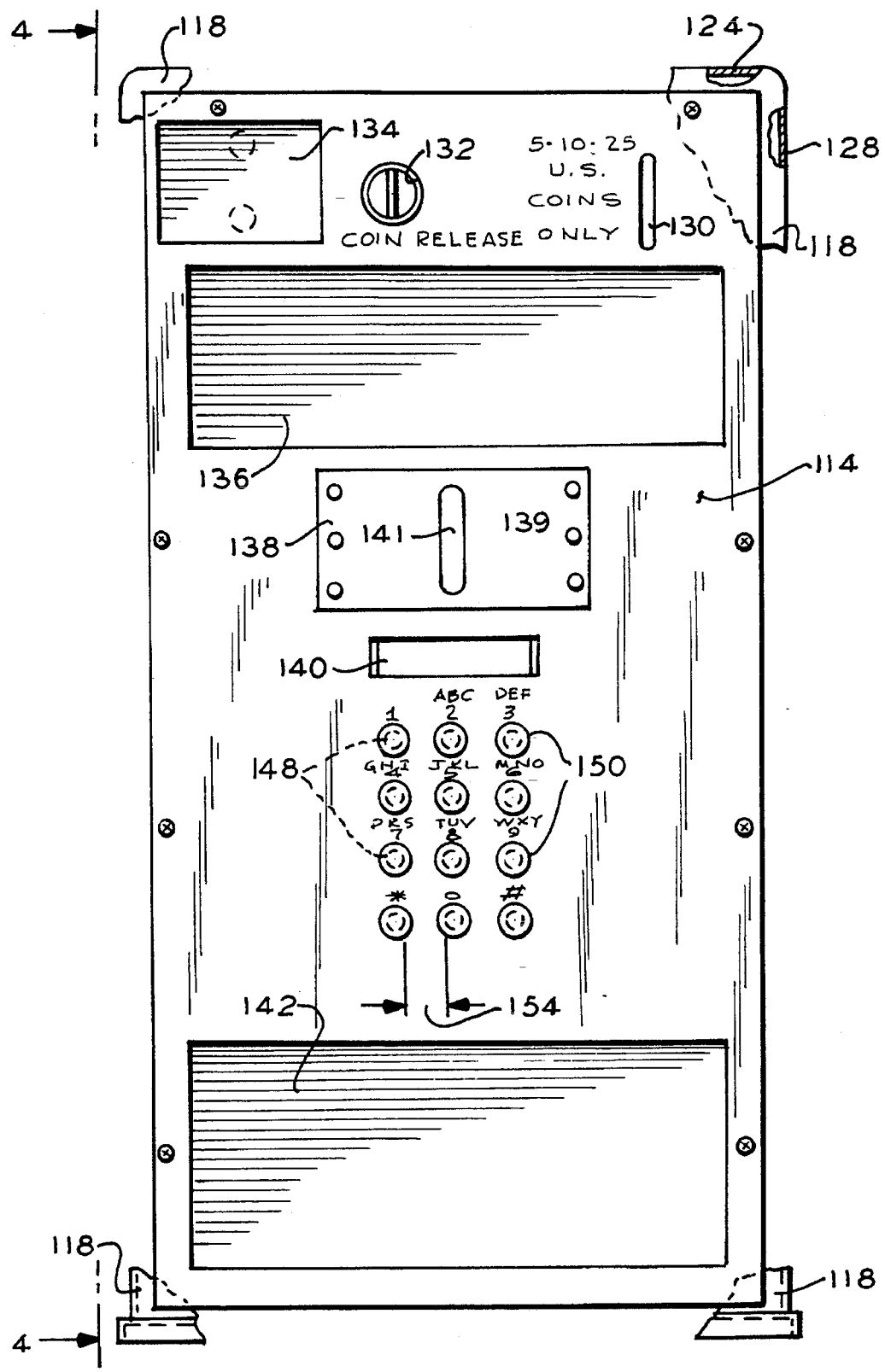
FIG. 3 is an elevation view of a public telephone according to the present invention.

Shown in FIGS. 1 and 2 is a prior art public telephone generally indicated at 10 which is illustrated for comparison purposes. The public telephone or public telephone box has a housing 12, front wall 14 and a key pad 16.

Housing 12 has a return 18, a rear wall 20, a bottom wall 22, a top wall 24, a left side wall 26 and a right side wall 28; wall 18 front wall 14.

Front wall 14 has a coin slot 30, with the indicia reading "5.10.25 U.S. Coins Only" printed on face plate 14, next to coin slot 30. Face plate 14 also has a coin release handle hole 32, with the indicia reading "coin release" printed on face plate 14, next to handle hole 32. Front wall 14 also has a first notice recess 34, a second notice recess 40, a third notice cut out 36, a fourth notice cut out 38 and a fifth notice cut out 42. Recesses 34 and 40 and cut outs 36, 38 and 42 have notices (not shown) printed thereon. Slot 30 and hole 32 extend through wall 18.

Front wall 14 has twelve (12) common square holes, including first hole 44 and eleven (11) identical holes. Key pad 16 has twelve (12) square actuators, including first actuator 46 and eleven (11) identical actuators. Each actuator 46 has dial information disposed thereon, on the end surface thereof. Each pair of holes 44 forms a web portion 47 therebetween. In this embodiment, web portion 47 measures about 0.125 inches in width, in both vertical and horizontal orientations.

One problem with prior art telephone is that the web portions 47 can be broken away by impact forces directed normal thereto. Such damage permits access by a thief to coins deposited in the telephone 10 as well as to the electronics.

As shown in FIGS. 3 and 4, according to the invention, a public telephone 110 is provided. Box 110 has a housing 112, a face plate 114 and a key pad 116.

Housing 112 has a return 118, a rear wall 120, a bottom wall 122, a top wall 124, a left side wall 126 and a right side wall 128. Wall 118 supports face plate 114.

Face plate 114 has a coin slot 130, with the indicia reading "5.10.25 U.S. Coins Only" printed on face plate 114, next to coin slot 130. Face plate 114 also has a coin release handle hole 132. Slot 130 and hole 132 extend through wall 118. Face plate 114 also has a first notice recess 134, a second notice recess 140, a third notice or recess 138 containing a vertical slot or cut out 141 for head set switch activator bar (not shown). This prevents access of a thief to the internal working of the telephone. A fourth notice cutout 136 and a fifth notice cut out 142 are also provided. Recesses 134, 138, 140, and cut outs 136 and 142 have indicia (not shown) marked therein. Plate 139 is a force resisting plate.

Wall 118 and plate 114 form a wall assembly which supports pad 116. Holes 144 have web portions 147 disposed therebetween.

Each actuator 146 has a respective rod or stem 148 which is integral therewith. The stem 148 can have an enlarged button or head 150. Face plate 114 has respective numerals and letters disposed above each button 150.

Figure 5:
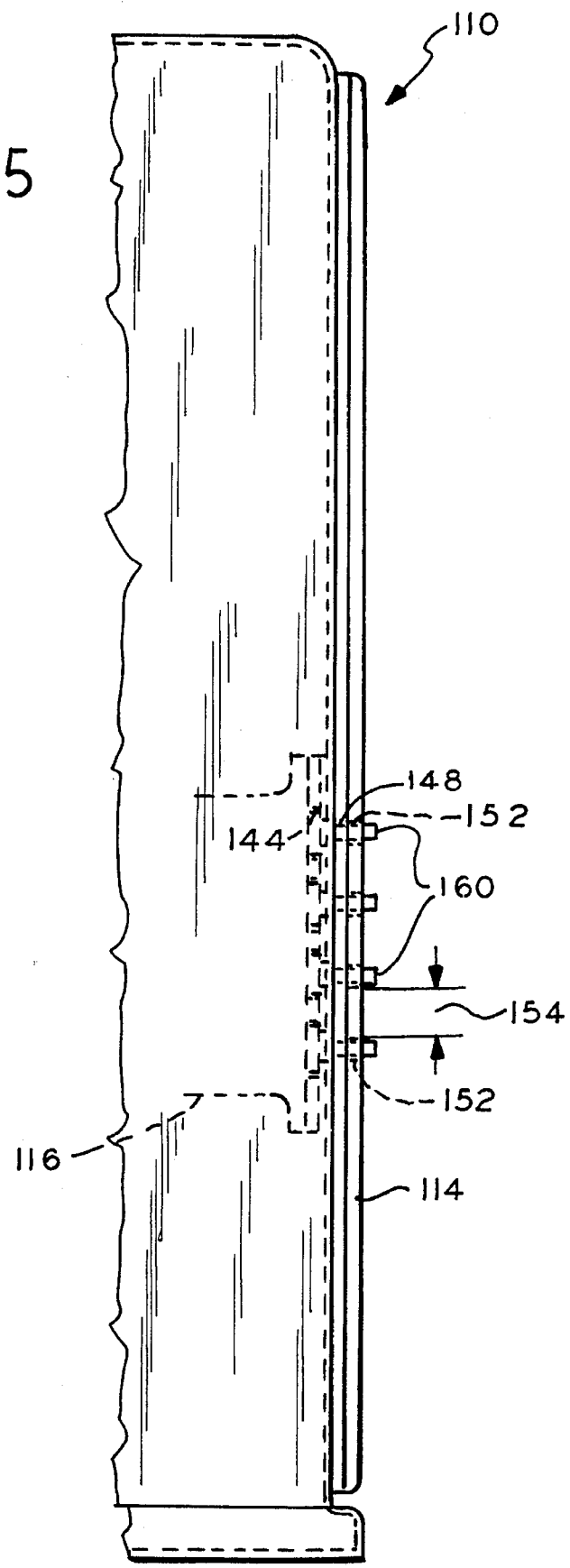
FIG. 5 is an elevation view similar to FIG. 4 showing another modification.

As shown in FIG. 5 the button 150 is replaced with a smaller head 160 which can be cyclical and approximately the same size as the stem 148.

Face plate 114 has twelve (12) relatively small holes, including first hole 152, which is a typical hole. Small hole 152 is substantially smaller in diameter than hole 144 located on the key pad. Holes 152 form web portions 154 therebetween. Web portions 154 measure about 0.50 inches in width, which is about three (3) times wider and two (2) times thicker than the corresponding prior art web portion 47. The stronger web portions 154 minimize the possibility of breaking the web to gain access to the box inside telephone 110.

Figure 7:
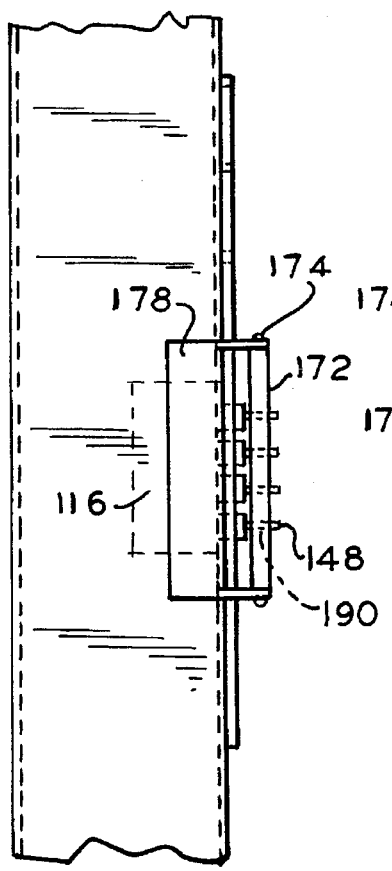
FIG. 7 is a side elevation view of a the device shown in FIG. 6.
Figure 6:
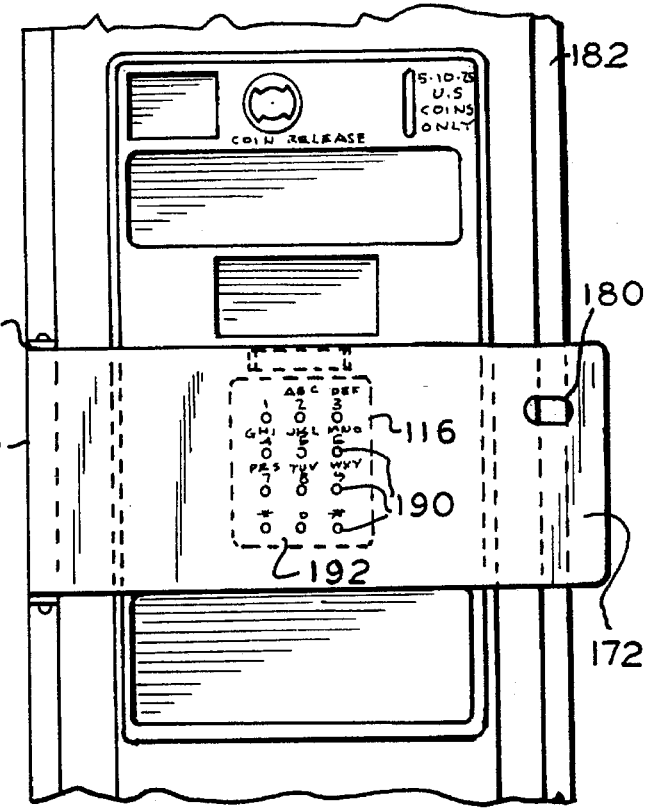
FIG. 6 is an elevation view sowing another configuration of the invention.
Figure 8:
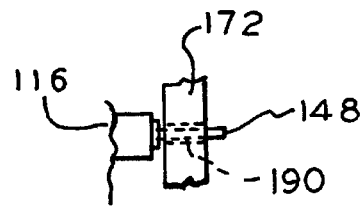
FIG. 8 is a enlarged elevation view showing the arrangement of a button.

Another modification of the invention is shown in FIGS. 6, 7 and 8 which is applied over an existing telephone unit which is fastened to a pedestal 182. In this modification a face plate cover 172 spaced from the key pad 116 is provided. The face plate cover 172 can have a hinge 174 along one vertical edge 176 of the plate 172. The hinge 174 is affixed to a side plate 178 which is welded or otherwise fastened to the side wall of the pedestal 182. The opposite vertical side extends beyond the face of the telephone unit and is affixed to a pedestal 182 which holds the telephone unit in an upright position by a padlock (not shown) or similar securing means. The plate 172 is made of steel or similar force resisting materials. The plate 172 is provided with twelve (12) relatively small holes, including first hole 190, which is a typical hole. Rods 148 extend through the holes to contact the push buttons on the telephone key pad 116. When the individual rods 148 are depressed it depresses the corresponding push button on the key pad 116. The rods 148 are either affixed individually to the keys or the rods 148 are keyed to each hole 190 to limit the horizontal movement. FIG. 8 illustrates the construction of one rod and the key pad 116 in this modification.

According to the invention, telephone 110 cannot be easily vandalized by going through the telephone key pad 116 to get to the coins inside or the electronics or through the slot for the hand piece. Frequency of damage to the expensive key pad 116 and adjacent parts is thereby minimized.

The advantages of public telephone 110 are indicated hereafter.

A) Extent and frequency of damage to 110 is minimized;

B) Damage to the relatively expensive key pad 116 and electronics is minimized;

C) Modification of a prior art telephone 10 to conform to telephone 110 according to the invention is facilitated by the addition of smaller holes 152 through front wall 118 and through face plate 114; and D) Telephone 110 has an anti-theft face plate 114.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. In a public telephone comprising a housing having walls, including a front wall; a standard telephone key pad mounted on the interior of the front wall; said key pad having square actuator keys; said actuator keys having a selective vertical spacing and a selective horizontal spacing for ease of fingertip operation; and a pedestal for holding the public telephone in an upright position for use, a force resistant face plate mounted on the exterior of the front wall covering the key pad to reduce the opportunity to vandalize the telephone; the face plate having a plurality of small round holes corresponding in location with the square actuator keys; each of said holes having associated therewith a rod passing through each hole for contacting the surface of the corresponding square actuator key, the distance between the rods being at least four times the distance between the square actuator keys.

2. The public telephone in accordance with claim 1 wherein each of the rods is keyed to each of the holes.

3. The public telephone in accordance with claim 1 wherein each of the rods is secured to each of the corresponding actuator keys.

4. The public telephone of claim 1, wherein each of the rods has a head portion for ease of fingertip operation.

5. The public telephone of claim 1, wherein the front wall and face plate have a common coin slot extending therethrough.

6. The public telephone of claim 1, wherein the distance between each of the rods is about 0.50 inches in width.

7. The public telephone of claim 1, wherein the face plate is fixedly connected to the front wall, thereby forming a reinforced wall assembly.

8. In a public telephone comprising a housing having walls, including a front wall; a standard telephone key pad mounted on the interior of the front wall; said key pad having square actuator keys; said actuator keys having a selective vertical spacing and a selective horizontal spacing for ease of fingertip operation; and a pedestal for holding the public telephone in an upright position for use, a rectangular force resistant face plate covering the key pad to reduce the opportunity to vandalize the telephone, the face plate having opposite vertical sides, the face plate being affixed through a hinge along one of the vertical sides thereof to the vertical upright and the opposite vertical side affixed to the vertical upright; the face plate having a plurality of small round holes corresponding in location with the square actuator keys; each of said holes having associated therewith a rod passing through each hole for contacting the surface of the corresponding square actuator key, the distance between the rods being at least four times the distance between the square actuator keys.

9. The public telephone in accordance with claim 8 wherein each of the rods is keyed to each of the holes.

10. The public telephone in accordance with claim 8 wherein each of the rods is secured to each of the corresponding actuator keys.

11. The public telephone of claim 8, wherein each of the rods has a head portion for ease of fingertip operation.

12. The public telephone of claim 8, wherein the rods are about 0.50 inches apart.

\* \* \* \* \*